United States Patent Office 3,536,579
Patented Oct. 27, 1970

3,536,579
CARBOHYDRATE TRANS-FUSED CYCLIC CARBONATE WET-END ADDITIVES FOR PAPER
Baruch S. Shasha, Peoria, William M. Doane, Morton, and Edward I. Stout, Dunlap, Ill., assignors to the United States of America as represented by the Secretary of Agriculture
No Drawing. Filed Aug. 8, 1967, Ser. No. 659,232
Int. Cl. D21h 3/20; C07g 3/00; C08h 19/00
U.S. Cl. 162—175
2 Claims

ABSTRACT OF THE DISCLOSURE

Strengthening agents for wet-end addition to starch-containing papermaker's furnishes comprise the 2,3-trans-fused cyclic carbonate and corresponding thionocarbonate esters of methyl 4,6-O-benzylidene-α-D-glucopyranoside, of low molecular weight dextran, and of dextrin, the carbonate rings of which additives are then ruptured in situ by triethylamine catalyzed reaction to provide the analogous linear carbonate ester derivatives.

Concurrently filed, commonly assigned application S.N. 659,233 of Doane and Shasha teaches a process for obtaining quantitative yields of bis(1,2:5,6-di-O-isopropylidene-3-O-thiocarbonyl-α-D-glucofuranose) disulfide having utility as wet-end additive for obtaining high strength paper.

DETAILED DESCRIPTION OF THE INVENTION

This invention relates to the production of paper having significantly improved wet and dry strength characteristics by a simple wet-end addition to a triethylamine catalyzed papermaker's cellulosic pulp slurry also containing chemically unmodified but gelatinized starch and a small amount of a novel carbohydrate derivative selected from the group consisting of the 2,3-trans-fused cyclic carbonate or thionocarbonate derivatives of methyl 4,6-O-benzylidene-α-D-glucopyranoside, or of the corresponding derivatives of corn starch dextrin or of low molecular weight dextran (i.e., an industrial grade with a mol wt. of 15,000-20,000) which cyclic carbonate or thionocarbonate products by some still unresolved mechanism apparently actively promote the incorporation of the gelatinized starch onto the cellulosic fibers.

The instant invention for the first time provides a process whereby substantial amounts of unmodified starch can be used as an agent for the internal sizing of paper through novel additives that in conjunction with the starch provide enhanced wet and dry strength properties.

It should be pointed out that the above invention is confined to the trans-fused cyclic carbonate or thionocarbonate derivatives and that the cis-fused cyclic carbonates as exemplified by methyl 4,6-O-benzylidene-α-mannopyranoside 2,3-carbonate are inoperative for the preparation of the improved paper.

Until our underlying recent discovery that five-membered trans-fused cyclic carbonic and thiocarbonic esters of pyranosides can be formed in high yields under certain conditions from pyranosides that contain exclusively vicinal trans-hydroxyl groups, the previously published literature authoritatively taught that such pyranosides can give only the acyclic (alkyl) carbonates due to steric limitations, see, e.g., Hough et al., Advan. Carbohyd. Chem. 15 (1960), 91 (pp. 101, 103, 105, and 108 pert.) and Hough et al., J. Chem. Soc. (London) (1962) 1934.

In the presence of starch and a catalytic amount of triethylamine or sodium carbonate the 2,3-cyclic linkage of the carbonate ester is broken, resulting in the formation of a high molecular weight starch carbonate derivative.

The following examples, which are intended to be illustrative rather than limiting, will serve to describe our invention in greater detail.

EXAMPLE 1

Five milliliters of dioxane having dissolved therein 1.0 gram of methyl 4,6-O-benzylidene-α-D-glucopyranoside was treated with 10 ml. of ethyl chloroformate and the mixed solution was then cooled in an ice-water bath. While swirling the chilled solution, a solution of triethylamine (5 ml.) in benzene (30 ml.) was added dropwise. After 1 hour at 5° C. the reaction mixture was extracted with dilute HCl and then washed with water until neutral. The organic layer was dried and evaporated to a syrup which showed one component by TLC (thin-layer chromatography). Upon adding hexane to a chloroform solution of the syrup, 980 mg. (89% yield) of methyl 4,6 - O-benzylidene-α-D-glucopyranoside 2,3-carbonate melting at 115–117° C. crystallized therefrom and was then recrystallized from ether hexane, $[\alpha]_D^{25}+69°$ (c. 1.0 chloroform),

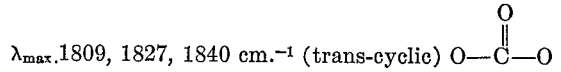

$\lambda_{max}$.1809, 1827, 1840 cm.$^{-1}$ (trans-cyclic) O—C—O

Analysis.—Calc. for $C_{15}H_{16}O_7$ (percent): C, 58.4; H, 5.2. Found (percent): C, 58.2; H, 5.3.

EXAMPLE 2

Two grams of industrial grade dextran with a molecular weight of about 15,000–20,000 was dissolved in DMSO. Then 3 ml. each of triethylamine and dioxane were added. After cooling the mixture to 10° C., 2 ml. of ethylchloroformate was added dropwise. After 2 minutes the pH was adjusted to neutrality with 5 N HCl, and the neutralized solution was added to 200 ml. 95% ethanol in a blender. After 1 minute of mixing and 5 minutes of standing, the supernatant was decanted to leave the desired precipitate which was then washed first with 95% ethanol and then with diethyl ether, and finally dried at 60° C. to give 1.9 grams of the dextran trans-fused carbonate ester.

The product revealed strong adsorption for the cyclic carbonate group in the infrared region near 1825 cm.$^{-1}$ region. Digestion of a sample of the product with barium hydroxide followed by back titration of excess barium hydroxide with standardized sulfuric acid indicated a D.S. (degree of substitution) of 0.35.

EXAMPLE 3

One gram of waxy maize starch dextrin having a molecular weight of about 5000 was dissolved in DMSO. Then 5 ml. of triethylamine and 3 ml. of dioxane were added. After the mixture was cooled to 5° C., 3 ml. of ethylchloroformate was added dropwise. After 10 minutes of stirring the dextrin trans-cyclic carbonate product was precipitated with diethyl ether, washed several times times with 95% EtOH, then with absolute ethanol and finally with ether. Upon vacuum drying, there was obtained 0.9 gram of a water-soluble fluffy white powder exhibiting carbonyl peaks in the infrared region near 1825 cm.$^{-1}$ and 1750 cm.$^{-1}$.

EXAMPLE 4

One-hundred grams of cellulosic pulp containing 24.8 grams dry weight of fiber was suspended in 1000 ml. of tap water. Then 125 ml. of a 2% dispersion of gelatinized starch was added, followed by 1.5 ml. of triethylamine. Then 25 ml. acetone containing 0.650 gram of methyl 4,6-O-benzylidene-α-D-glucopyranoside 2,3-carbonate was added to the furnish. After 5 minutes of stirring, 5 ml. of 10% alum solution was added, and diluent water was added to bring the final volume of the furnish to 5000 ml. Then 660 ml. portions of the furnish were used to prepare standard Tappi handsheets weighing approximately 3.8 grams each. The handsheet specimens were dried at 72° F. and 50% relative humidity and then tested on Tappi equipment. Wet strengths were determined after 30 minutes of soaking. Table I sets forth the improved strengths of the paper sheets prepared according to the invention compared with sheets from a furnish that was identical excepting for the omission of the methyl 4,6-O-benzylidene-α-D-glucopyranoside 2,3-carbonate.

TABLE I

| | Burst strength pound | Dry tensile, meters | Wet tensile, meters |
|---|---|---|---|
| Experimental | 71.7 | 9,340 | 730 |
| Control | 59.1 | 7,440 | 240 |

EXAMPLE 5

Twenty ml. of a 2% aqueous suspension of pregelatinized corn starch (containing 0.4 gram starch, dry basis) was placed in a Waring Blendor and 3 ml. of an acetone solution containing 0.152 gram of methyl 4,6-O-benzylidene-α-D-glucopyranoside 2,3-carbonate (equivalent to 0.2 mole per mole starch glucopyranosyl unit) was added. Although the cyclic carbonate promptly precipitated, it quickly redissolved upon the addition of triethylamine (or aqueous $Na_2CO_3$ solution), and was followed virtually immediately by precipitation of the starch reaction product. After blending for 5 minutes, 200 ml. of acetone was added and the precipitated product was collected and washed first in water and then in acetone. A 0.560 gram yield of dry product indicated that there had been an essentially quantitative reaction of the cyclic carbonate with the starch so that the resulting D.S. had an average value of about 0.2 per starch glucopyranosyl unit. The reaction was confirmed by the absence of the characteristic cyclic carbonate adsorption in the 1809–1840 cm.$^{-1}$ region and by the presence of acyclic carbonate adsorption near the 1750 cm.$^{-1}$ region. Digestion of a portion of the product with a standard solution of barium hydroxide followed by titration of the excess of base with standard sulfuric acid confirmed a D.S. of 0.2.

EXAMPLE 6

To 5 ml. of a 5-percent solution of starch in DMSO were added 0.238 gram of methyl 4,6-O-benzylidene-α-D-glucopyranoside 2,3-carbonate and 1.5 ml. of triethylamine. The mixture was stirred 16 hours at 25° C. and then extracted successively with ether, acetone, and ethanol. The residue was transferred to a blender and again extracted with ethanol. The suspension was filtered and the precipitate was dried to constant weight, yield 0.438 gram (90%). The infrared spectrum revealed carbonyl adsorption at 1750 cm.$^{-1}$. Digestion of a portion of the product with barium hydroxide followed by titration of the excess of base with standardized sulfuric acid indicated a D.S. of about 0.4.

EXAMPLE 7

Example 6 was repeated with the exception that methyl 4,6-O-benzylidene-α-D-glucopyranoside 2,3-thionocarbonate was substituted for the oxygen analog. The sulfur content indicated a D.S. of very nearly 0.4.

A nonexclusive, irrevocable, royalty-free license in the invention herein described, throughout the world for all purposes of the United States Government, with the power to grant sublicenses for such purposes, is hereby granted to the Government of the United States of America.

We claim:
1. A strength-improving agent for addition to papermaker's cellulosic pulps chosen from the group consisting of 2,3 - trans - fused, cyclic carbonate esters of methyl 4,6 - O - benzylidene - α - D - glucopyranoside, 2,3-trans-fused cyclic carbonate esters of dextran having a molecular weight of about 15,000–20,000, and 2,3-trans-fused cyclic carbonate esters of corn starch dextrin having a molecular weight of about 5,000.

2. Paper produced by a process comprising:
 (a) adding an amount of 2,3-trans-fused cyclic carbonate esters of methyl 4,6-O-benzylidene-α-D-glucopyranoside to a papermaker's cellulosic furnish that also contains pregelatinized starch and sufficient triethylamine to catalyze the opening of the cyclic carbonate ring portions of said 2,3-trans-fused cyclic carbonate esters of methyl 4,6-O-benzylidene-α-D-glucopyranoside; and
 (b) preparing a paper from the product of step (a), said amount of 2,3-trans-fused cyclic carbonate esters of methyl 4,6-O-benzylidene-α-D-glucopyranoside being of sufficient quantity to impart wet strength to said paper.

References Cited

Chemical Abstracts, vol. 67, 1967.

S. LEON BASHORE, Primary Examiner

F. FREI, Assistant Examiner

U.S. Cl. X.R.

260—209, 210